(12) United States Patent
Kailas et al.

(10) Patent No.: US 8,312,071 B2
(45) Date of Patent: Nov. 13, 2012

(54) METHOD AND STRUCTURE FOR PROVABLY FAIR RANDOM NUMBER GENERATOR

(75) Inventors: Krishnan Kunjunny Kailas, Tarrytown, NY (US); Brian Chan Monwai, Austin, TX (US); Viresh Paruthi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1251 days.

(21) Appl. No.: 12/101,734

(22) Filed: Apr. 11, 2008

(65) Prior Publication Data

US 2009/0259705 A1 Oct. 15, 2009

(51) Int. Cl.
*G06F 7/58* (2006.01)

(52) U.S. Cl. .................................................. 708/250
(58) Field of Classification Search .................. None
See application file for complete search history.

(56) References Cited

U.S. PATENT DOCUMENTS

| 4,291,386 | A  | * | 9/1981 | Bass ............................ 708/252 |
| 6,714,955 | B2 | * | 3/2004 | Le Quere ..................... 708/250 |
| 7,219,113 | B2 | * | 5/2007 | Bonaccio et al. ............. 708/250 |
| 2005/0071399 | A1 | * | 3/2005 | Bonaccio et al. ............. 708/250 |
| 2007/0150531 | A1 | * | 6/2007 | Jeon ............................ 708/250 |

* cited by examiner

*Primary Examiner* — David H Malzahn
(74) *Attorney, Agent, or Firm* — Daniel P. Morris; McGinn IP Law Group, PLLC

(57) ABSTRACT

A random number generator includes a fairness checker and correction module that ensures that a complete random sequence within a predetermined period of time will be output by the random number generator.

12 Claims, 5 Drawing Sheets

Fig. 7
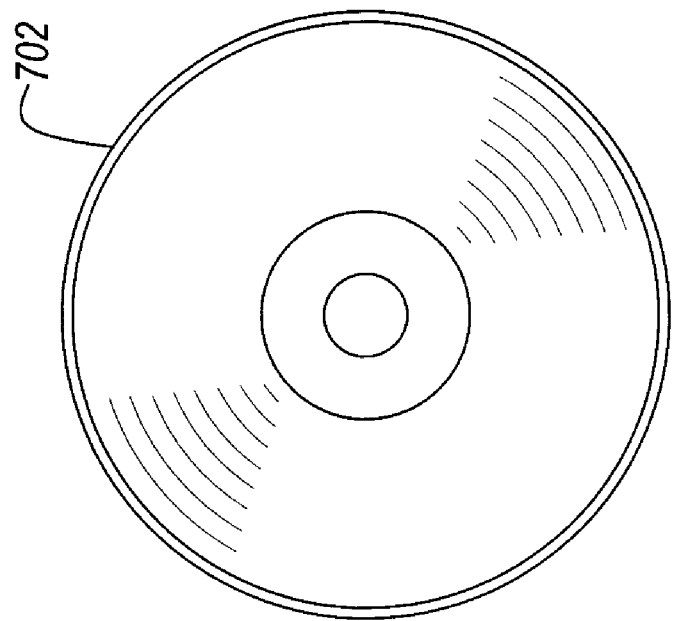
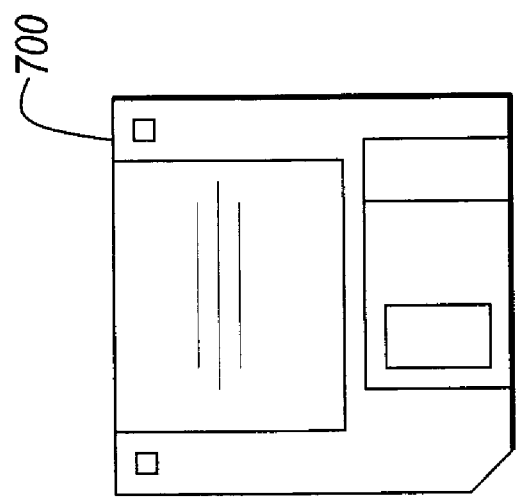

METHOD AND STRUCTURE FOR PROVABLY FAIR RANDOM NUMBER GENERATOR

This invention was made with Government support under Contract Number HR0011-07-9-0002, awarded by the Defense Advanced Research Projects Agency (DARPA). The Government has certain rights in this invention.

CROSS-REFERENCE TO RELATED APPLICATIONS

The present Application is related to the following co-pending application:

U.S. Patent Application filed on May 9, 2008, Kailas et al., entitled "Bounded Starvation Checking of an Arbiter Using Formal Verification", now U.S. Pat. No. 7,752,369, issuing on Jul. 6, 2010;

also assigned to the present assignee, and incorporated herein by reference.

BACKGROUND OF THE INVENTION

1. Field of the Invention

The present invention generally relates to random number generation. More specifically, a fairness checker and correction logic module provides a provably fair random number generator.

2. Description of the Related Art

Random numbers are commonly used in areas such as communication, cryptography, and even games, where the property of interest is the generation of hard to guess numbers. Random number generators are also used in arbitration logic, wherein the property of interest is to avoid fixed or rotating priority.

For example, arbiters are used for restricting access requests to shared resources, as when there are more number of requests than the maximum number requests that can be satisfied concurrently, in such applications as access to cache directory, shared bus, etc. Arbiters are commonly based on one of several priority functions, including:

fixed (certain requests always have higher priority than others);
round-robin (strict rotation of priority assignment); and
random (any request can have the highest priority, at random).

In random priority arbitration, any request can become the highest priority request at random. For example, as demonstrated by the arbitration scheme 100 in FIG. 1, request i gets its turn at time t when the value of random number $r(t)=f(i)$, where $f(i)$ is a function of i. The goal of this arbitration 100 is to provide unbiased service to all requests.

Thus, pseudo random number generators such as LFSR (linear feedback shift register) have many uses in electronic systems such as microprocessors and peripheral chips. For example, LFSR-based arbitration logic is used in several places in a processor such as in the logic used for restricting multiple concurrent accesses to cache directories and shared buses. An LFSR is used in such arbiters to assign random priority to the input requests.

It is often necessary to have the sequence of random numbers generated by a random number generator adhere to certain desired fairness properties. For example, in order to provide fairness to the input requests, a random priority based arbitration logic must be starvation free (i.e., it does not starve any requests indefinitely or beyond a certain number of cycles). LFSR-based random priority arbiters are commonly used for granting a subset of several concurrent read and write requests to access the cache directory in every cycle. In such random priority-based arbiters, one of the pending requests is granted access to the cache directory based on the random number generated by the LFSR logic in the current cycle. A request will be starved if the specific random number corresponding to the request is not generated by the LFSR for a long time.

Clearly, delaying a directory access request beyond a certain number of cycles can have serious performance impact. Therefore, in real applications, it is not sufficient to prove that the random number generator produces a random number sequence because it only proves that any given random number will be generated eventually (i.e., any given request will be granted eventually). We must also be able to guarantee that any unique random number will be generated within an acceptable finite time interval in order to meet the expected fairness properties of the arbiter.

Main properties of random numbers include predictability and distribution. The property of predictability means that it is highly unpredictable to be random, with no repeating sequences. The property of distribution requires a uniform frequency distribution, meaning that each random number must have the same frequency in an infinitely long sequence.

True random numbers are hard to generate, leading to the many pseudo-random number generators commonly implemented. There are literally hundreds of patents and patent applications related to random number generation, all of which seem to focus on the properties mentioned above, and LFSR (Linear Feedback Shift Register) is perhaps the most popular one currently used.

For example, US Patent Application Publication No. US 20020159590 to Ikeda, entitled "Random number generator which can generate a random number based on an uniform distribution", describes a technique for generating random numbers that is guaranteed to have a uniform distribution. Their technique cannot generate random numbers that has bounded fairness, the problem solved by the present invention.

A technical paper by Dershowitz et al., entitled "Bounded Fairness", discusses the concept bounded fairness in more detail.

As a second example, US Patent Application Publication No. US 20050193045 to Yamamoto et al., entitled "Random number generator and probability generator", describes a technique for generating 1-bit and multi-bit random numbers that has a specific probability distribution. The goal of their technique is to realize a high speed and high performance probability generator without regularity, correlativity and periodicity. This scheme also cannot generate random numbers with guaranteed bounded fairness properties, as can the present invention.

US Patent Application Publication No. US 20030065691 to Schmidt, entitled "Method and apparatus for generating random numbers with improved statistical properties", describes a technique for combining a plurality of random number generators into a combined random number generator such that the combined random number generator produces random number sequences that has the least amount of repeated patterns. The technique is based on using the inter-arrival time of individual random number generators to generate a combined random number sequence that has uniformly distributed random numbers. This scheme does not address the problem solved by present invention of generating random numbers with guaranteed bounded fairness properties.

In U.S. Pat. No. 6,408,317, issued Jun. 18, 2002, to Djakovic, entitled "Random number conditioner", is described a technique aimed at generating sequence of random numbers that can not be easily predicted. It uses a random number generator "conditioner" that uses an XOR function to combine the input bit stream with a checksum of it and new LFSR generated random number sequence. This scheme cannot generate random numbers with guaranteed bounded fairness properties.

Thus, a need continues to exist to provide a method and structure for a provably fair random number generator.

SUMMARY OF THE INVENTION

In view of the foregoing, and other, exemplary problems, drawbacks, and disadvantages of the conventional systems, it is an exemplary feature of the present invention to provide a provably fair random number generator.

It is, therefore, an exemplary feature of the present invention to provide a structure and method for such provably fair random number generator.

Therefore, in a first exemplary aspect of the present invention, to achieve the above features and objects, described herein is a random number generator including a fairness checker and correction module that ensures that a complete random sequence within a predetermined period of time will be output by the random number generator.

In a second exemplary aspect, also described herein is a method of generating a sequence of random numbers, including ensuring that a complete random sequence is output within a predetermined bounded time, the complete random sequence comprising a condition that each number possible to be generated by said random number generator occurs at least one time in said complete random sequence.

In a third exemplary aspect, also described herein is a fairness checker and correction module for a random number generator, including logic that ensures that a complete random sequence will be output by the random number generator within a predetermined bounded time, the complete random sequence comprising a condition that each number possible to be generated by said random number generator occurs at least one time in said complete random sequence.

The present invention, therefore, provides a mechanism that can be used by any application of a random number generator in which the system response time or other such similar functionality is dependent on the specific random number values in the random number sequence, such as when the application demands a bounded, yet non-deterministic, response time. The present invention also helps eliminate the need for estimating and proving the upper bound for the request-to-grant delay of a pseudo random number (LFSR)-based arbitration scheme using formal verification methods.

BRIEF DESCRIPTION OF THE DRAWINGS

The foregoing and other purposes, aspects and advantages will be better understood from the following detailed description of exemplary embodiments of the invention with reference to the drawings, in which:

FIG. 7 illustrates exemplarily a signal bearing medium 700 (e.g., storage medium) for storing steps of a program of a method according to the present invention.

DETAILED DESCRIPTION OF EXEMPLARY EMBODIMENTS OF THE INVENTION

Figure 1:
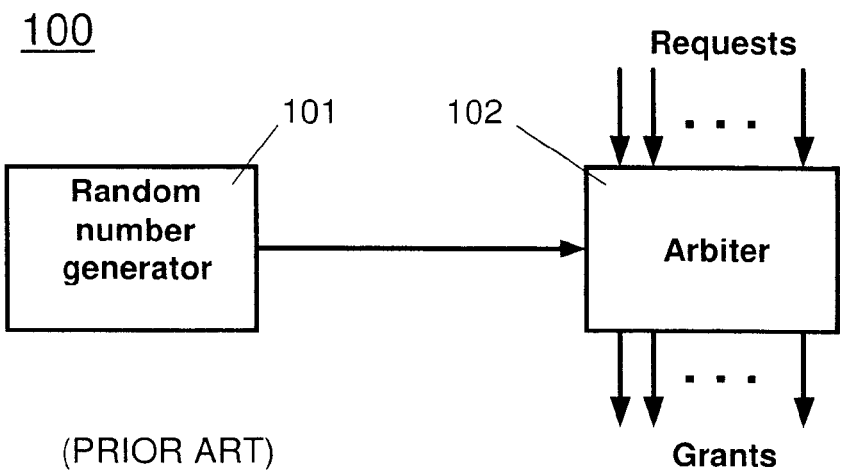
FIG. 1 exemplarily illustrates a conventional application 100 of a random number generator 101, as used in an arbiter 102.

Referring now to the drawings, and more particularly to FIGS. 1-7, there are shown exemplary embodiments of the method and structures according to the present invention.

Figure 2:
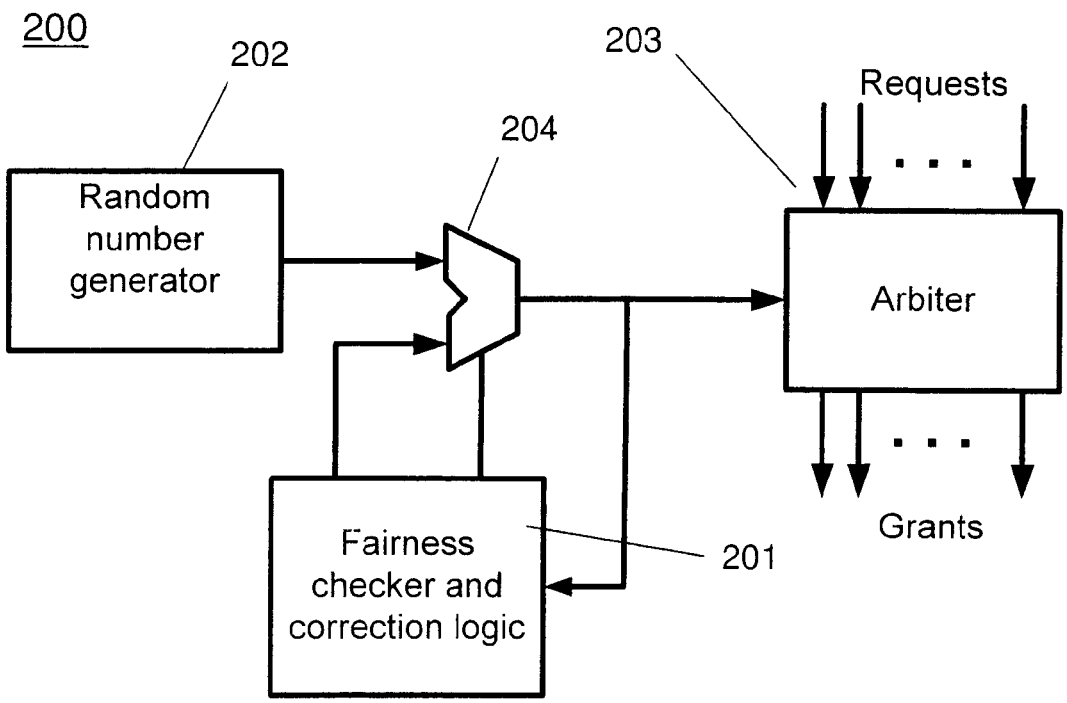
FIG. 2 illustrates a first exemplary embodiment 200 of the present invention.

The present invention solves the problem of provably fair random number generation by providing, in a first exemplary embodiment 200 shown in FIG. 2, a simple add-on logic module 201 that can be connected to the output of any random number generator (e.g., 202) such that its output becomes compliant to a desired fairness property, in addition to being random. Thus, the present invention provides a method of modifying any pseudo random number generation logic such that the output sequence is both pseudo random and fair within a defined number of cycles.

It is noted that the present invention can be implemented in either hardware or software, and the discussion herein is not intended as limiting. Thus, if the original random number generator is implemented in software, then the method of the present invention can likewise be implemented in software, as an add-on software module that executes the function similar to that described herein. There is also no limit of using a hybrid system, wherein the functions described in the present invention comprises hardware or software and the other functions conventionally associated with random number generation is implemented differently.

Figure 3:
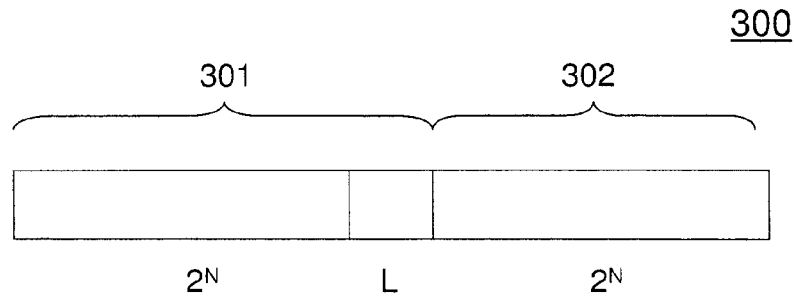
FIG. 3 illustrates the concept 300 of a complete random number sequence within a preset period of time.

The solution of the present invention is based on monitoring the output of a random number generator, such as an LFSR-based system, and inserting the "missing" random number(s) in a timely fashion, such that the modified random number sequence is not only random but also meets the desired fairness property, a concept shown exemplarily in FIG. 3.

It is hard to prove the fairness properties of logic blocks that use pseudo random number generators. For instance, estimating and proving the upper bound for the request-to-grant delay of an LFSR-based arbitration scheme using formal verification methods is a well known hard problem.

In contrast, the present invention makes the formal verification of pseudo random number generator driven logic easy because it allows one to implement random number generators that generates random number sequences that strictly conform to the precise fairness constraints, which in turn allows one to use such precise constraints on the random inputs (rather than including the entire LFSR logic as a part of the design under verification) in order to prove the correctness of the logic block.

For simplicity, assume that a random number generator is capable of randomly generating any one of the following numbers: 0, 1, 2, 3. This possible set of four numbers can be characterized as having 4=2N elements, where N=2 is the number of bits necessary to represent any one of the 4 unique numbers in the possible sequence. It should be clear that the shortest possible sequence of randomly-generated numbers that has each element at least once will be a sequence in which each possible element appears exactly once, which, in the binary domain, would be length 2N elements, where N is the number of bits needed to represent the largest number possibly generated. Although this explanation is based on a binary implementation, it should be clear that the concepts described in the following discussion similarly apply in any other domain.

As shown exemplarily in FIG. 3, the "complete random sequence" in a random number sequence is defined as the shortest contiguous sequence of random numbers that has all the possible unique random numbers at least once. As explained, there are 2N unique numbers in the output of a random number generator (e.g., LFSR) that can generate an N bit random number. Therefore, if the random number generator can generate one random number in every cycle, the length of the shortest "complete random sequence" will be 2N cycles.

However, the longest "complete random sequence" generated by a pseudo random number generator can also be infinitely long, as exemplarily indicated by the "freely random" sequence 301 on the left, showing that a freely random number generator may take a variable number of (2N+L) cycles, where L can be any integer, from 0 to infinity, to generate a "complete random sequence" that has all the unique random numbers at least once.

In an exemplary embodiment, the present invention can insert missing numbers in at most 2N cycles as shown by the sequence 302 in FIG. 3 such that a complete random sequence can be always found between 2N and 2*2N cycles in the sequence of numbers generated by the random number generator. But of course, it should be clear that other embodiments are possible, wherein the predetermined time for having all possible numbers present at least one time is longer than the minimum possible number of cycles 2N, and such longer predetermined times are intended as covered in the present invention, since the method of ensuring that a complete sequence has occurred is the same for any amount of time longer than the minimal number of cycles 2N.

Comparing the conventional random number generator shown in FIG. 1, the exemplary embodiment shown in FIG. 2 guarantees that the maximum length of the "complete random sequence" produced by a random number generator is a constant M=(2*2N)+L, where L is a constant determined by the fairness requirements of the design using the random number generator output and whose minimum value is 0.

Figure 4:
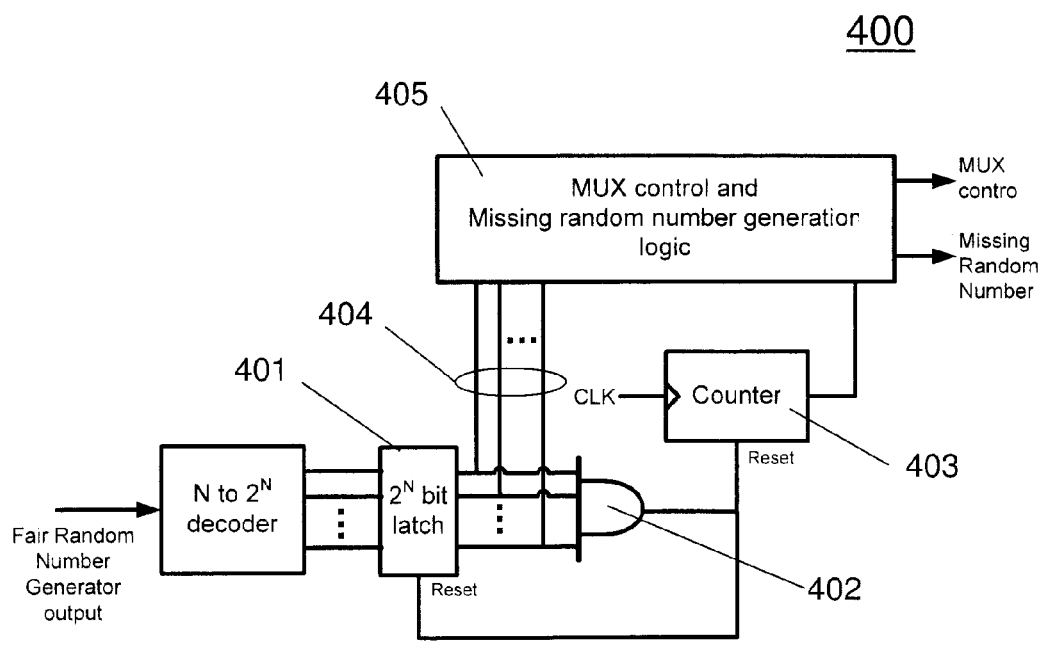
FIG. 4 illustrates an exemplary embodiment 400 of the fairness checker and correction logic module 201 shown in FIG. 2 that ensures that all numbers within a sequence have occurred at least once.

FIG. 4 exemplarily shows the logic circuit 400 that can be used for checking the fairness of random number sequence. A 2N bit register 401, in combination with logic gate 402, keeps track of the occurrence of each one of the 2N unique random numbers that can possibly be generated.

Counter 403 is used as a timer to count the number of cycles since the last "complete random sequence" was produced by the random number generator. The counter output is compared against the predetermined time 2N+L. Whenever the count is greater than 2N+L, the missing unique random number values are gated into the "fair random number generator" output using a multiplexer 204 (see FIG. 2). The 2N bit latch outputs 404 are used for identifying the missing random numbers needed to obtain a "complete random number sequence". A state machine in the control module 405 can be used for reading the latch bits that are still zero and to generate an encoded output corresponding to each latch bit that was not set. The encoded random values are sent out, one per cycle, until the entire latch bits are set, thus completing the "complete random sequence" within a bounded time.

The additional logic 201 shown in FIG. 2, therefore, allows any random number generator (e.g., LFSR) to produce all the possible unique random values within a fixed number of cycles. It is also possible to include the above mentioned logic for checking fairness constraints and compensating/correcting the lack of fairness as a part of the logic that consumes the random number sequences in an application specific manner.

The implementation above indicates that an arbitrary predetermined time can be preset as the time period over which the complete random sequence is ensured. Thus, in some implementations, the user could provide an input for setting the period L shown in FIG. 3, including the instance where L=0. Alternatively, such period L could be predetermined by design as non-adjustable.

The mechanism that ensures such enforcement of a complete random sequence could be as simple as monitoring how many missing numbers are outstanding and then forcing their presence the appropriate number of cycles prior to the preset time period, using any number of mechanisms depending upon how the number generator and fairness checker/correction logic is implemented.

Exemplary Software Implementation

Figure 5:
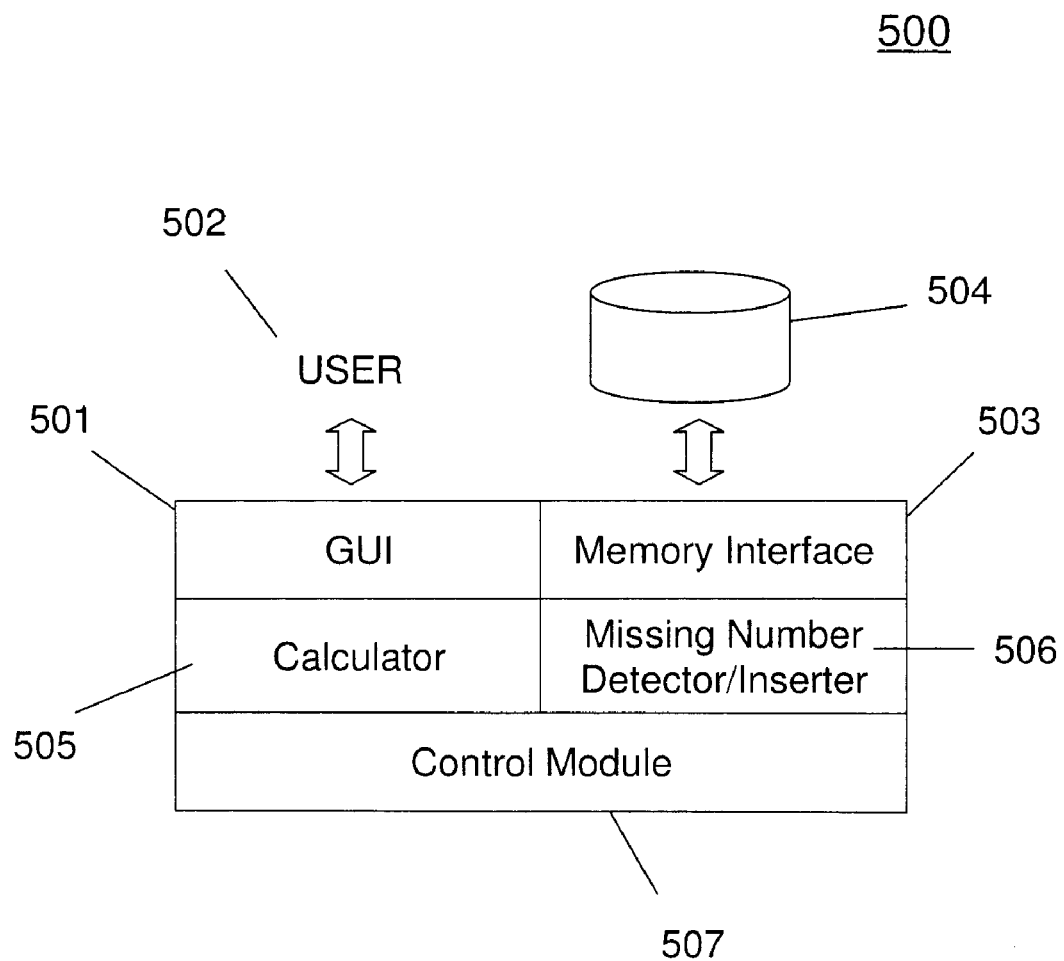
FIG. 5 illustrates an exemplary second embodiment 500 of the present invention, as might be implemented in software.

FIG. 5 exemplarily shows a possible block diagram 500 of a software module that could be used to implement the present invention, such as might be used as an add-on software module to a random number generator already implemented in software. A command-line or Graphical user interface 501 permits a user 502 to enter inputs, such as parameters related to the predetermined time period, and possibly to permit the user 502 to view an appropriate display of the current operation or functioning of the module. Memory interface 503 serves to interface with a memory function 504 for storage of such parameters as the predetermined time and temporary storage of the numbers detected as still missing during a current timing period.

Calculator 505 performs such calculations as comparison of the present cycle with the preset time period and determining an appropriate cycle to begin inserting missing numbers in order to meet the preset time period. Missing number detector/inserter module 506 keeps track of the missing numbers and allows those missing numbers to be inserted. Control module 507 keeps overall control and would typically be a main function controlling the various modules just described, by appropriately invoking subroutines that define those modules.

Exemplary Hardware Implementation

Figure 6:
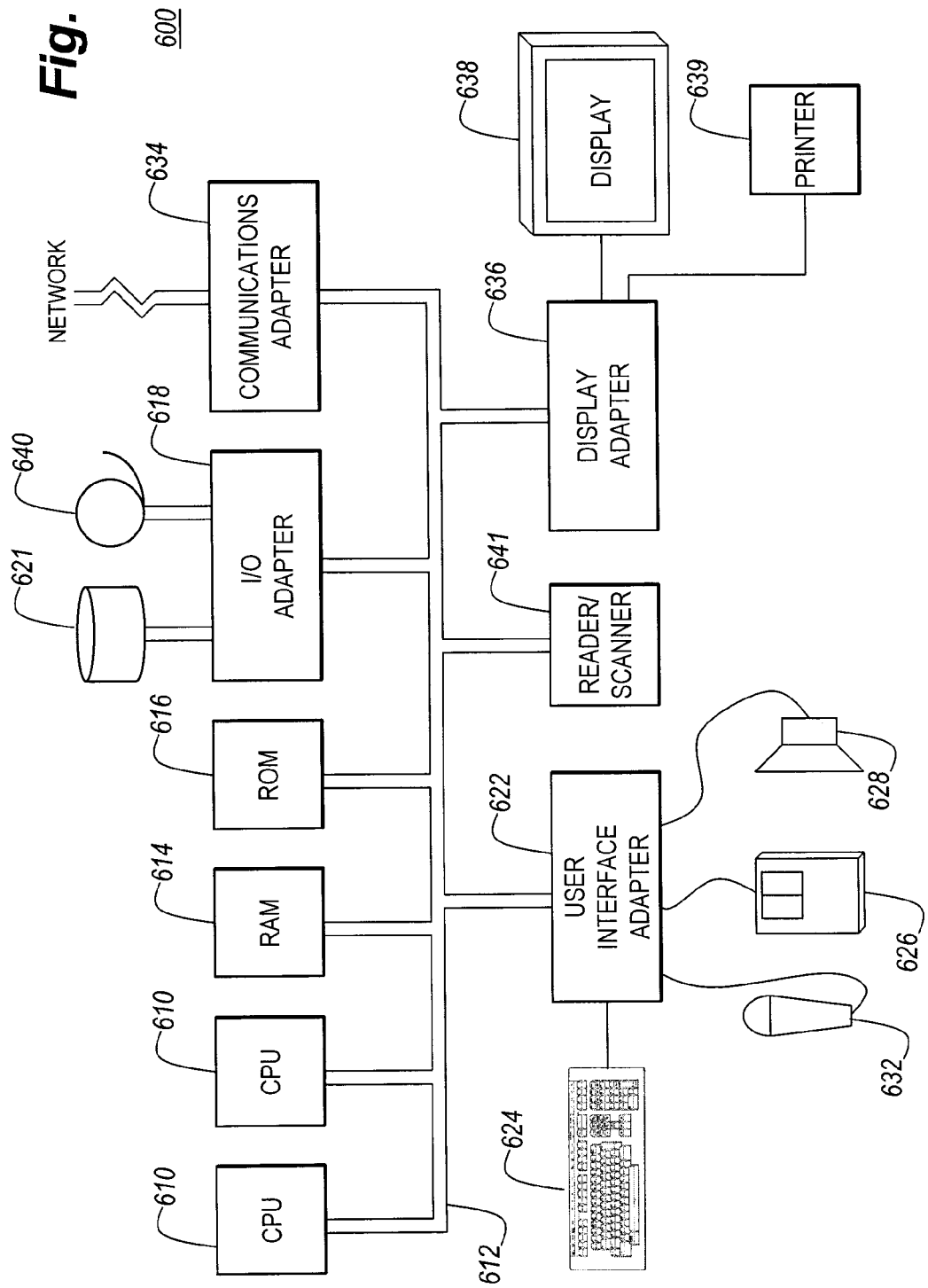
FIG. 6 illustrates an exemplary hardware/information handling system 600 for incorporating the present invention therein.

FIG. 6 illustrates a typical hardware configuration of an information handling/computer system in accordance with the invention and which preferably has at least one processor or central processing unit (CPU) 611.

The CPUs 611 are interconnected via a system bus 612 to a random access memory (RAM) 614, read-only memory (ROM) 616, input/output (I/O) adapter 618 (for connecting peripheral devices such as disk units 621 and tape drives 640 to the bus 612), user interface adapter 622 (for connecting a keyboard 624, mouse 626, speaker 628, microphone 632, and/or other user interface device to the bus 612), a communication adapter 634 for connecting an information handling system to a data processing network, the Internet, an Intranet, a personal area network (PAN), etc., and a display adapter 636 for connecting the bus 612 to a display device 638 and/or printer 639 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 611 and hardware above, to perform the method of the invention.

This signal-bearing media may include, for example, a RAM contained within the CPU 611, as represented by the fast-access storage for example. Alternatively, the instructions may be contained in another signal-bearing media, such as a magnetic data storage diskette 700 (FIG. 7), directly or indirectly accessible by the CPU 611.

Whether contained in the diskette 700, the computer/CPU 611, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code.

Thus, the present invention is appropriate for any application of random number generators in which the system response time or other such similar functionality is dependent on the specific random number values in the random number sequence, in particular if the application demands a bounded, yet non-deterministic, response time. The present invention also helps to eliminate the need for estimating and proving the upper bound for the request-to-grant delay of a pseudo random number (LFSR)-based arbitration scheme using formal verification methods.

While the invention has been described in terms of various exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. A random number generator, comprising:
   an output terminal;
   a random number generating module that generates a sequence of random numbers as an output to be selectively provided to said output terminal; and
   a fairness checker and correction module that ensures that a complete random sequence will be output by said random number generator within a predetermined bounded time, said complete random sequence comprising a condition that each number possible to be generated by said random number generator occurs at least one time in said complete random sequence,
   wherein said random number generating module and said fairness checker and correction module are tangibly embodied in a program of machine-readable instructions executable by a digital processing apparatus on a non-transitory, computer-readable storage medium.

2. The random number generator of claim 1, wherein said fairness checker and correction module monitors said sequence of random numbers for numbers missing from said complete random sequence in a window of time related to said predetermined bounded time.

3. The random number generator of claim 2, further comprising:
   a multiplexer function controlled by said fairness checker and correction module, an output of said multiplexer providing numbers to be applied to said output terminal, a first input of said multiplexer receiving said sequence of random numbers from said random number generator and a second input of said multiplexer receiving said missing numbers from said fairness checker and correction module, said fairness checker and correction module controlling when said missing numbers are inserted into said output of said random number generator.

4. The random number generator of claim 2, wherein said missing numbers are determined by monitoring which numbers of said complete random sequence have not yet occurred within said window of time of said random number generator.

5. The random number generator of claim 1, further comprising:
   a counter that counts clock cycles and compares a number of said clock cycles with said predetermined bounded time.

6. The random number generator of claim 1, wherein said predetermined bounded time is adjustable by a user input.

7. The random number generator of claim 1, wherein said computer-readable storage medium comprises one of:
   a stand-alone diskette to be inserted into a computer disk drive;
   a read-only memory (ROM) on a computer storing said machine-readable instructions as ready to be executed by said computer or to be transmitted to another computer; and
   a random-access memory (RAM) on said computer as currently executing said machine-readable instructions.

8. A fairness checker and correction module for a random number generator, comprising:
   logic, as tangibly embodied in a program of machine-readable instructions executable by a digital processing apparatus on a non-transitory, computer-readable storage medium, that ensures that a complete random sequence will be output within a predetermined bounded time, said complete random sequence comprising a condition that each number possible to be generated by said random number generator occurs at least one time in said complete random sequence.

9. The fairness checker and correction module of claim 8, further comprising:
   an input receiving a sequence of random numbers generated by a random number generator, said input sequence of random numbers being checked by said logic, to ensure said complete random sequence; and
   a monitor monitoring said input sequence of random numbers for numbers missing from said complete random sequence in a window of time related to said predetermined bounded time.

10. The fairness checker and correction module of claim 9, further comprising:
    a controller for a multiplexer, an output of said multiplexer providing numbers to be the output of said random number generator, a first input of said multiplexer receiving said sequence of random numbers from said random number generator and a second input of said multiplexer receiving said missing numbers from said fairness checker and correction module, said fairness checker and correction module controlling when said missing numbers are inserted into said output of said random number generator.

11. The fairness checker and correction module of claim 8, further comprising:
a counter that counts clock cycles and compares a number of said clock cycles with said predetermined bounded time, wherein said missing numbers are determined by monitoring which numbers of said complete random sequence have not yet occurred within said window of time of said random number generator.

12. The fairness checker and correction module of claim 8, wherein said predetermined bounded time is adjustable by a user input.

* * * * *